United States Patent [19]

Koike

[11] 4,285,659
[45] Aug. 25, 1981

[54] MOLD DEVICE FOR AN INJECTION MOLDING MACHINE

[76] Inventor: Hiroyasu Koike, Daitakubo 1901, Urawa-shi, Saitama-ken, Japan

[21] Appl. No.: 31,609

[22] Filed: Apr. 19, 1979

Related U.S. Application Data

[63] Continuation-in-part of Ser. No. 837,722, Sep. 29, 1977, abandoned.

[30] Foreign Application Priority Data

Sep. 30, 1976 [JP] Japan .................................. 51-117604
May 23, 1977 [JP] Japan .................................. 52-66024

[51] Int. Cl.³ .............................................. B29C 1/03
[52] U.S. Cl. .................................... 425/547; 425/570; 425/571; 425/DIG. 51
[58] Field of Search ............... 425/566, 567, 568, 569, 425/570, 571, 572, 549, DIG. 229, DIG. 51, 547

[56] References Cited

U.S. PATENT DOCUMENTS

| | | | |
|---|---|---|---|
| 2,871,517 | 2/1959 | Allard | 425/549 X |
| 2,928,125 | 3/1960 | Smucker | 425/568 X |
| 3,077,636 | 2/1963 | Peters | 425/568 X |
| 3,537,139 | 11/1970 | Segmüller | 425/549 |
| 3,822,856 | 7/1974 | Gellet | 425/549 X |
| 3,849,048 | 11/1974 | Bielfeldt | 425/567 |
| 3,867,080 | 2/1975 | Bruder | 425/572 X |
| 3,941,540 | 3/1976 | Driscoll | 425/571 X |
| 4,043,740 | 8/1977 | Gellet | 425/566 X |
| 4,128,385 | 12/1978 | Allen | 425/568 X |

FOREIGN PATENT DOCUMENTS

| | | | |
|---|---|---|---|
| 1014316 | 8/1957 | Fed. Rep. of Germany | 425/568 |
| 46-18627 | 5/1971 | Japan | 425/568 |

*Primary Examiner*—Thomas P. Pavelko
*Attorney, Agent, or Firm*—Fidelman, Wolffe & Waldron

[57] ABSTRACT

The present invention relates to a mold device for an injection molding machine which consists of an injection machine and a mold device. The mold device is divided into two portions, namely, a mounting portion and a molding portion, which are designed so that they may be handled individually and/or integrally. The present invention further provides an arrangement in which the molding portion may be installed on the mounting portion with considerable transverse tolerance, despite employment of a hot runner system therein.

5 Claims, 21 Drawing Figures

MOLD DEVICE FOR AN INJECTION MOLDING MACHINE

This application is a continuation-in-part of Ser. No. 837,722, Sept. 29, 1977, now abandoned.

The present invention relates to a mold device for an injection molding machine which consists of an injection machine and a mold device.

The mold device for the injection molding machine is roughly divided into a molding portion comprising a mold plate for actually molding products, and a mounting portion for mounting of the molding portion to effect mold opening and mold closing operations.

As described above, the mold device for the injection molding machine includes, in addition to the molding portion for directly molding the products, various constitutional members integrally incorporated therein to permit the molding portion to effect a predetermined operation thus constituting the entirety. However, these constitutional members involve a certain dimensional relation and a mutual positional relation for operation and installation, and therefore, in prior arts, when an attempt was made to change dimensions and shapes of molded articles (products), not only both mold plates but the entire mold device would have to be refabricated. As a consequence, the cost required for the mold device acceleratively increased as kinds of products of different dimension and shape increased, making the operation extremely uneconomical. Also, in prior injection molding machines, a large quantity of excess, nonuseable runners are formed, resulting in a reduction of the ratio of products required to consumed plastic material. In addition, these runners are formed and arranged branchwise along the surface between the mounting portion and the mold on the fixed side in the metal mold device. Since the molding portion is always subjected to cooling, molten plastic is partly solidified due to cooling during the passage through the runner, and the solidified plastic is adhered to wall surfaces of the runner to considerably reduce passage area. This reduction in passage area has resulted in a great loss in injection pressure of the molten plastic.

Hot runner systems have been employed in order to eliminate the disadvantages noted above with respect to the injection molding machine.

These hot runner systems are designed to directly inject the molten plastic into a mold cavity in the molding portion without forming a runner between the mounting portion and the molding portion.

In accordance with these hot runner systems, admittedly, neither a large quantity of runners are formed nor a loss in injection pressure is produced at the runner portion. However, these systems do pose various inconveniences: extremely strict positioning (or centering) is required when the mounting portion is combined with the molding portion; the gate is increased in diameter in terms of a minimal diameter of a nozzle orifice in the mounting portion; and the molding portion (incorporated into the expensive mounting portion) is greatly limited so that only a molding portion of a predetermined construction can be used. Further, hot runner nozzles used with the hot runner system are very expensive. In the past, the injection molding machines having a hot runner system incorporating the aforementioned expensive hot runner nozzles have been used only in the case where one product is formed by one injection machine; that is, only for obtaining one article, not for obtaining a number of articles.

The reason for this use is that the concept of a hot runner system is based on the fact that a molten plastic emergent out of the injection machine is directly guided to a gate by means of the hot runner mechanism, without considering that the hot runner mechanism is used to guide the molten plastic to numerous locations.

Of course, there does exist a molding machine adapted to obtain a number of articles by utilization of the hot runner system. For example, there is proposed a molding machine in which several products are handled by a single hot runner nozzle. This molding machine, however, causes the length of the runner formed between the mounting portion and the mold on the fixed side to be increased and thereby to lose the most significant advantage of the hot runner system.

Apart from this, when an attempt is made to provide a number of hot runner nozzles in one injection machine (in order to obtain a number of articles by means of the hot runner system), extremely high machining accuracy and installing and positioning accuracy are required at the time of installing and positioning molding portion to the mounting portion of the metal mold device. As a consequence, a considerable amount of expense, time, labor, and skill are required to fabricate the metal mold device; it becomes quite impossible to use one mounting portion in common to several molding portions, and this obviously results in a mold device of high cost.

The present invention has been contrived in an effort to overcome the above noted disadvantages of the prior art. The instant invention provides an arrangement wherein a metal mold device is divided into a mounting portion for holding both fixed and movable mold plates to impart the operations of mold opening and mold closing, and a molding portion comprising both mold plates and incorporating a mold releasing mechanism for releasing a molded product. The mounting portion and the molding portion are designed so that they may be handled independently, the molding portion being detachably mounted on the mounting portion without disassembling the latter. The mold device constructed as described above employs therein a hot runner system. A runner between the mounting portion and the molding portion may be achieved by means of a hot runner nozzle, even in the presence of minor errors in dimension with respect to machining and installing.

Prior art has disclosed a dimple above the gate for receiving a nozzle that necessarily protrudes into the dimple to form an article (which is not required as a final product) to serve as a heat insulator between the mold and the heated injection nozzle. However, this excess article is required to be of substantially uniform thickness along the periphery of the protruding nozzle to provide uniform heat insulation. Accordingly, an extremely high installation accuracy or tolerance is required for the centering of the nozzle with respect to the dimple.

With the instant invention, there is no such centering limitation. It is only required that all of the injected resin from the nozzle enters the dimple, not that the nozzle be centered in the dimple.

Further, the resin layer of the prior art, once molded, remains positioned between the nozzle and the molding portion (irrespective of parting of the molded article) as long as the same molten resin material is subject to injection molding; whereas, the waste sprue molded within the excess runner concave portion or dimple, in accordance with the present application, is parted (as a molded article not required) together with the molded article every one shot.

It is therefore an object of the present invention to use a typically expensive mounting portion in a mold device to which a plurality of different molding portions are attachable (for respectively different molded articles), thereby considerably reducing high equipment costs required for the molding apparatus without deterioration of molding and productive capacities.

It is another object of the invention to provide a metal mold device in which only the molding portion of an injection molding machine need be replaced, so that a product of a different kind may be molded and switching of production kind in the injection machine may be accomplished in short time and in a simple way.

It is a further object of the invention to facilitate installation of the molding portion on the mounting portion used in an injection molding machine employing a hot runner system.

It is another object of the invention to employ a hot runner system in which machining tolerance is greatly increased over the small tolerances of prior art.

It is another object of the invention to materialize a process for molding a plurality of articles, which utilizes a hot runner system in which excess runners (as molded articles not required) are extremely reduced.

Finally, it is another object of the invention to provide a mold device having a stripper plate to cooperate with the nozzle in such a manner as to remove a waste sprue that is formed on the nozzle each time that an article of use is formed by the mold device.

The above and other related objects and advantages of the invention will become apparent from the following detailed description of embodiments with reference to the accompanying drawings, in which:

FIGS. 1 and 2 are respectively longitudinal sectional views showing an embodiment of a mold device in accordance with the present invention which uses an ejector pin as a mold releasing mechanism of the standard type, FIG. 1 showing the mold when closed while FIG. 2 shows the mold when opened;

FIGS. 5 and 6 are respectively longitudinal sectional views showing an embodiment of a mold device in accordance with the present invention for a pinpoint gate of the three-plate type, FIG. 5 showing the mold when closed and FIG. 6 showing the mold when opened;

Referring now to the drawings, a mold device in accordance with the present invention is composed of a mounting portion A (all numbered components of the mounting portion have the suffix 'A') which serves as a portion for mounting and securing, to an injection machine, the entire mold device composed mainly of a mounting plate 1A on the fixed side and a mounting plate 2A on the movable side, and a molding portion B (all numbered components of the molding portion have the suffix 'B') composed mainly of a mold plate 1B on the fixed side and a mold plate 2B each forming a molding surface for a molded article. Mounting plate 1A, on the fixed side, serves as a mounting base for the injection machine to which the injection machine is connected by means of a locating ring 7A mounted integral with a spool bushing 8A. Mounting plate 2A, on the movable side, serves as the other base of the mounting portion A for mounting and securing the molding portion B and cooperates with the mounting plate 1A on the fixed side. A receiving plate 3A is for mounting and securing the mold plate 2B on the movable side of the molding portion B arranged and secured onto the mounting plate 2A on the movable side through a spacer block 4A which forms an operating space of a mold releasing mechanism in the molding portion B between both the mounting plates 1A and 2A.

The molding portion B comprises a combination of the mold plate 1B on the fixed side and the mold plate 2B on the movable side, a control mechanism such as a guide pin 3B for controlling a mutual position of both mold plates 1B and 2B, and a mold releasing mechanism using an ejector plate 5B or the like. It is so designed that the mechanisms which constitute the mold portion B may be assembled separately from the mounting portion A.

In installation and removal of the mounting portion A and the molding portion B, designed to be assembled individually as previously mentioned, suitable fastening mechanisms (not shown) using bolts or the like are used so that the mold plate 1B on the fixed side is fastened to the mounting plate 11A on the fixed side, and the mold plate 2B on the movable side is fastened to the receiving plate 3A.

As shown in FIGS. 1 through 4, a stop pin 9A, mounted on the mounting plate 2A on the movable side, is provided to adjust and set a withdrawal limit (a limit of downward movement in the figures) of an ejector plate 5B of the molding portion B.

Further, a guide pin bushing 5A, as in FIGS. 1 through 4, may be secured to the mounting plate 1A on the fixed side and adapted to slidably receive a guide pin 6A for controlling the mutual position between the mounting plate 1A on the fixed side and the mounting plate 2A on the movable side.

In the molding portion B, guide pin 3B is provided as a mechanism for controlling the relative position between the mold plate 1B on the fixed side and the mold plate 2B on the movable side to eliminate the necessity of mutual position control action on both the mold plates 1B and 2B by means of the guide pin 6A, which is a member of the mounting portion A.

Thus, by use of an exclusive guide pin 3B for controlling the mutual position of both the mold plates 1B and 2B the mold plates 1B and 2B may be completely disengaged from the guide pin 6A as the constituting member on the mounting portion A side, whereby the molding portion B may be assembled and handled as a portion independent from the mounting portion A.

Also, for the same purpose, the receiving plate 3A is separable from the molding portion B along the installing plane of the molding portion B to the mounting portion A.

The embodiments of the present invention will be described hereinafter by way of four typical types of mold devices.

Figure 1:
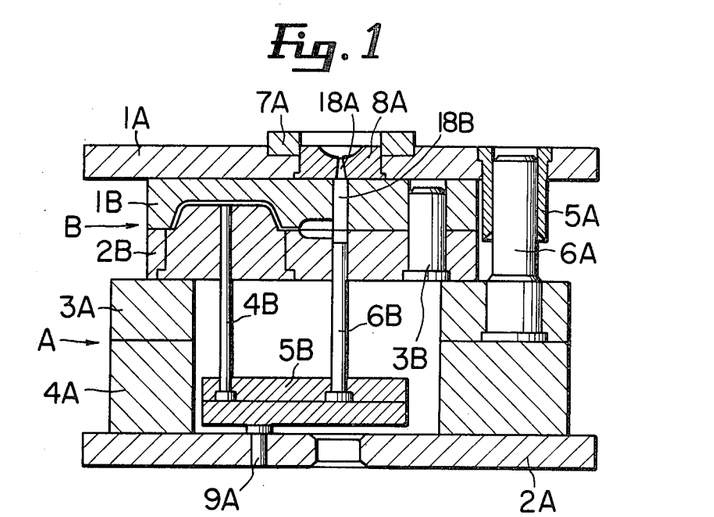
Figure 2:
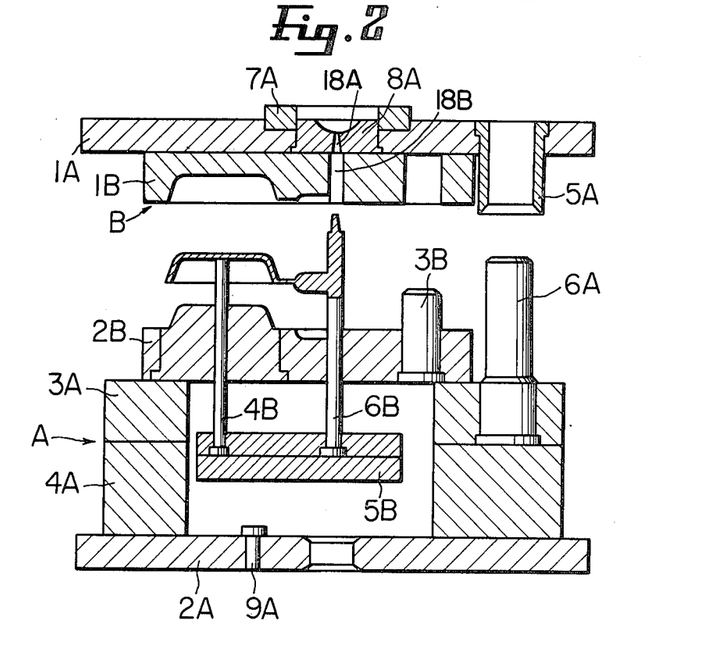

The embodiments shown in FIGS. 1 and 2 are of the standard type which uses an ejector pin 4B as a mold releasing mechanism, and an ejector plate 5B has an ejector pin 4B and a sprue lock pin 6B secured thereto in an upright posture and extending through the mold plate 2B on the movable side so that the top end of ejector pin 4B (upper end in the figure) forms a part of the molding mold surface.

Figure 3:
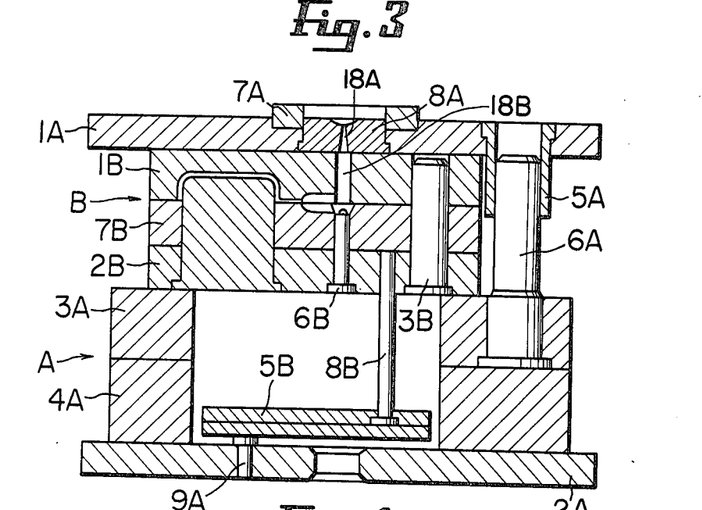
FIGS. 3 and 4 are respectively longitudinal sectional views showing an another embodiment of a mold device in accordance with the present invention which uses a stripper plate as a mold releasing mechanism of the standard type, FIG. 3 showing the mold when closed while FIG. 4 showing the mold when opened.
Figure 4:
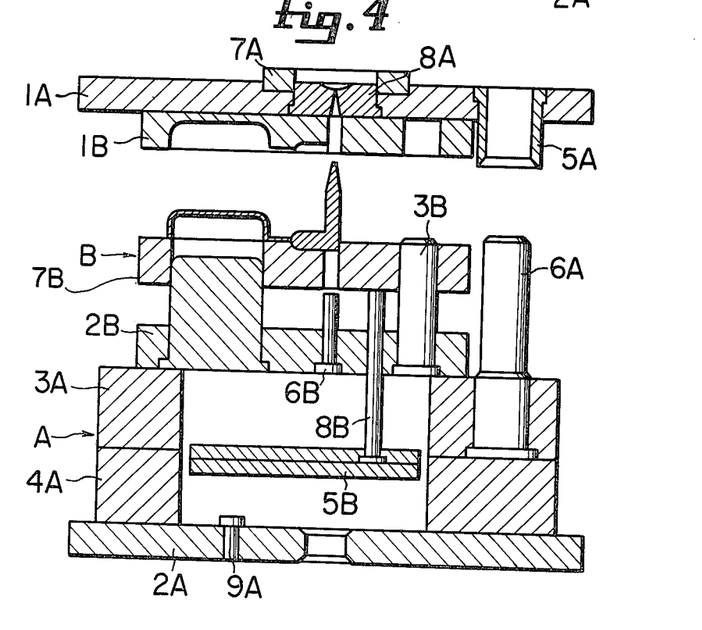

The embodiments shown in FIGS. 3 and 4 are of the standard type which use a stripper plate 7B, which is pushed up by a return pin 8B which extends through a portion displaced from a molding mold surface of the mold plate 2B on the movable side so that the top end thereof is brought into contact with the lower surface of stripper plate 7B to strip a molded article held on the mold plate 2B (correctly, core secured to the mold plate 2B on the movable side) upon upward displacement thereof.

This stripper plate 7B is separate from the mounting portion A similarly to the mold plates 1B and 2B, and is controlled in its operating direction between the mold plates 1B and 2B by the guide pin 3B.

Figure 6:
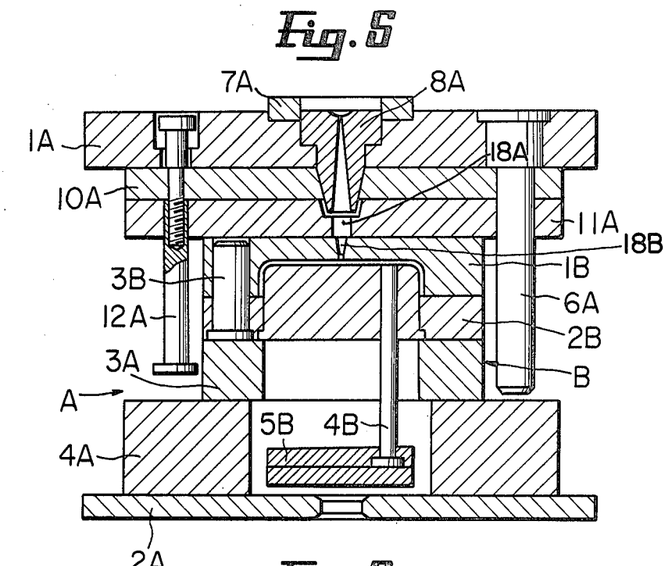

The embodiment shown in FIGS. 5 and 6 is of the three-plate type for a pinpoint gate, and the molding portion B is much the same as those disclosed in the above-mentioned embodiments; but the mounting portion A has additional elements such as a runner stripper plate 10A, a mounting plate 11A, pull bolts 12A and the like so that the structure becomes quite complicated. In this embodiment, mounting plate 11A is particularly provided for installation of the molding mold portion B on the mounting portion A.

Figure 7:
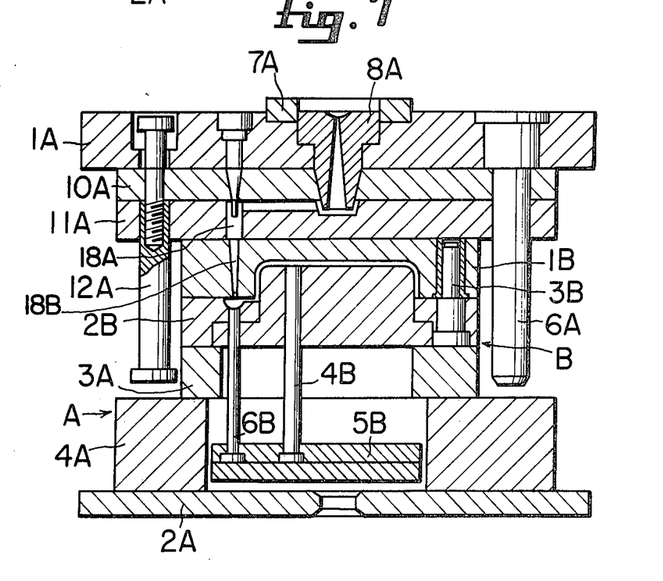
FIGS. 7 and 8 are respectively longitudinal sectional views showing an embodiment of a mold device in accordance with the present invention for an "L" runner of the three-plate type, FIG. 7 showing the mold when closed and FIG. 8 showing the mold when opened.
Figure 8:
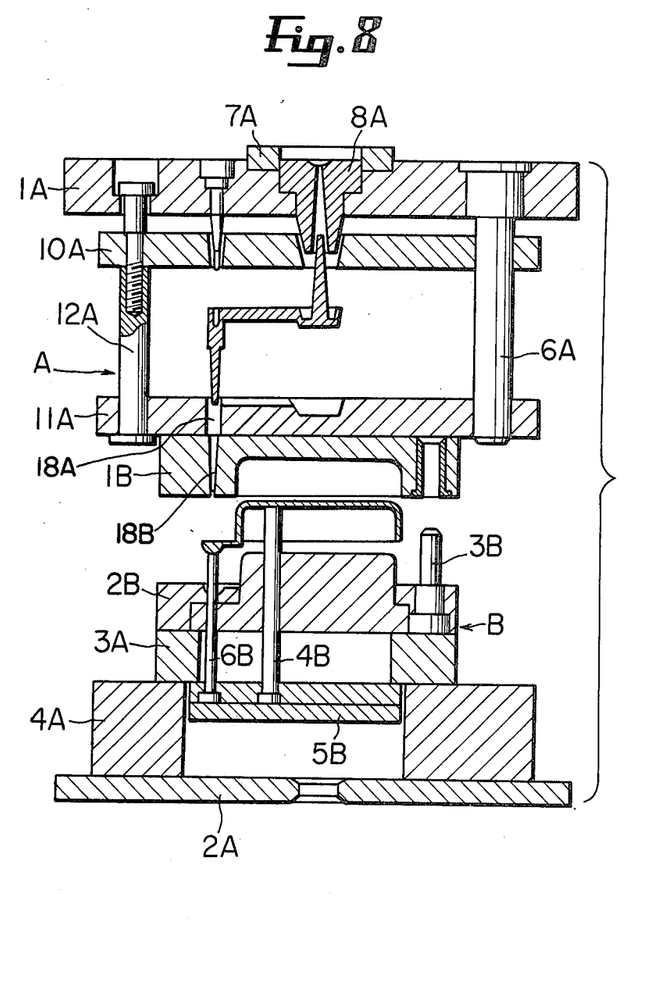

The embodiment shown in FIGS. 7 and 8 is of the three-plates type for an "L" runner, and the structures thereof are the same as those in the embodiment shown in FIGS. 5 and 6 with the only exception being a different runner system.

In the embodiments shown in FIGS. 5 through 8, the mounting portion A is much more complicated and larger in construction than the molding portion B, which serves to illustrate that small uncomplicated molding portions B can be interchangeably used with the mounting portion A.

It should be noted that, although not shown in the respective embodiments, operation of the ejector plate 5B is accomplished by means of a push-out rod in a manner similar to that accomplished by conventional metal mold devices.

Since the mold device in accordance with the present invention is designed so that the mounting portion A may be handled entirely individually and independently of the molding mold portion B, as previously mentioned, all that need be done is, when molded articles of different dimensions and configurations are to be molded, to replace only the molding portion B. The mounting portion A can be used without modification.

For this reason, a number of molding portions B may be interchangeably used with a single mounting portion A to thereby considerably reduce equipment cost involved in the metal mold device.

Particularly, in the case of those embodiments as shown in FIGS. 5 through 8, the mounting portion A is complicated and large in construction whereas the molding portion B is simple in construction, and the savings of time, effort, and expense become extremely remarkable.

Further, since the molding portion B can be handled as a single body, the molding portion B may be mounted on or removed from the mounting portion A in an easy manner to provide a good operational efficiency.

In addition, since both the mold plates 1B and 2B are members located on the molding portion B, the mutual posture and position thereof may be set without consideration of a relationship with the mounting portion A, and accordingly, both the mold plates 1B and 2B may be easily positioned, which is considered to be most important. Furthermore, positioning between the mold plate 1B on the fixed side and the mounting plate 1A or the mounting plate 11A on the fixed side may be achieved merely by positioning the sprue 18A on the mounting portion A side to the sprue 18B on the molding mold B side as seen in FIGS. 5 through 8. Also, in positioning between both sprues, it is simple to make sprue 18A larger in diameter than sprue 18B so as to avoid any obstacle resulting from a minor error in mounting, and as a consequence, positioning of various members which constitute the mold device becomes easy.

Next, an embodiment with a hot runner system applied to the mold device in accordance with the present invention above will be described with reference to FIGS. 9A through 14.

Figure 9A:
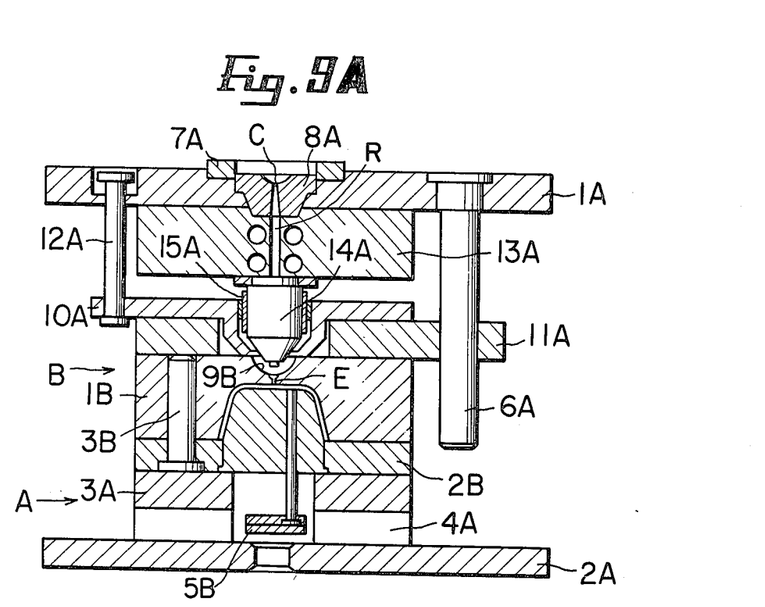
FIGS. 9A and 9B are respectively longitudinal sectional views of a mold device in accordance with the present invention where a hot runner system is employed in the mounting portion, FIG. 9A showing the mold closed and FIG. 9B showing the mold open.
Figure 9B:
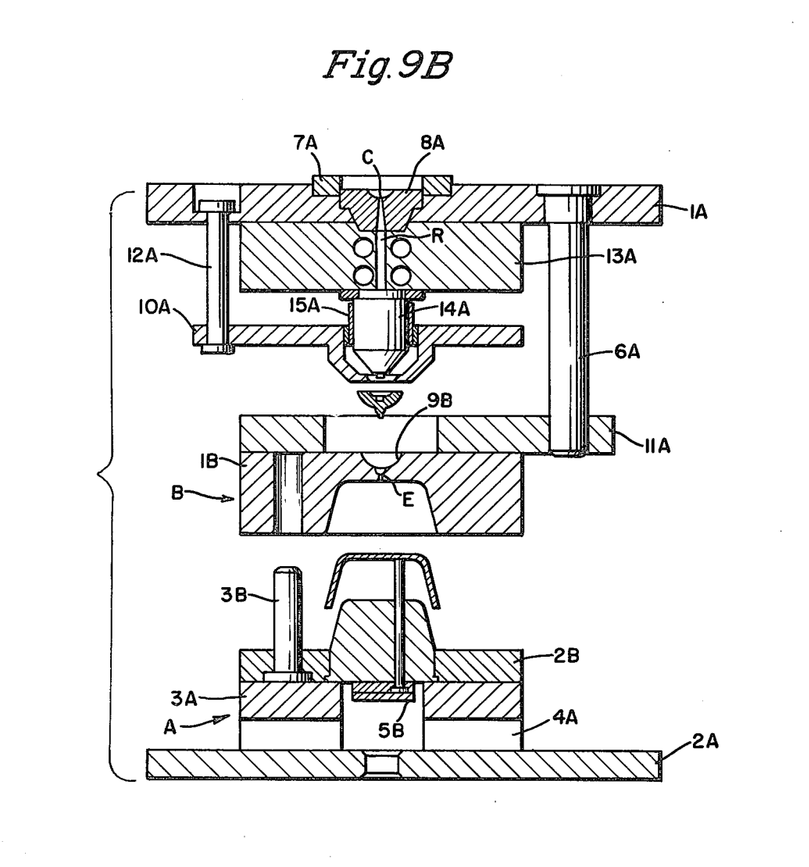
Figure 9C:
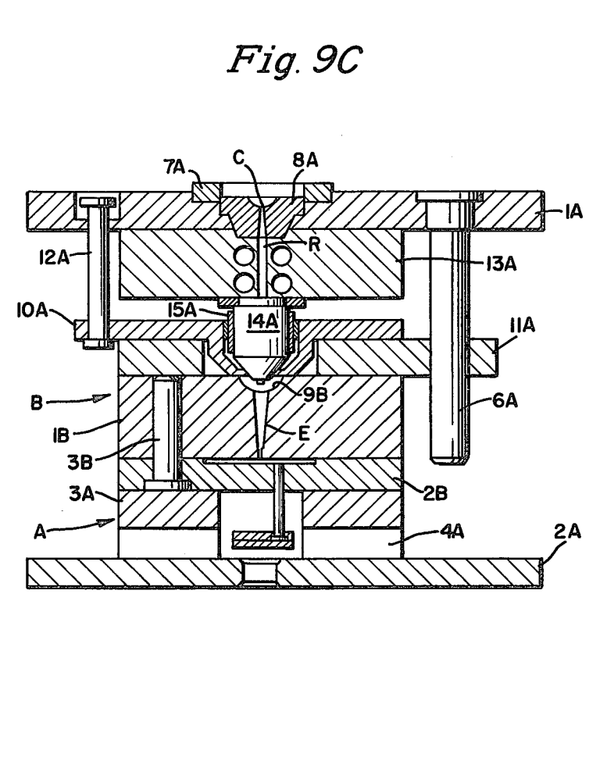
FIGS. 9C and 9D are respectively longitudinal views of another mold device in accordance with the present invention where a hot runner system is employed in the mounting portion, FIG. 9C showing the mold closed and FIG. 9D showing the mold open.
Figure 9D:
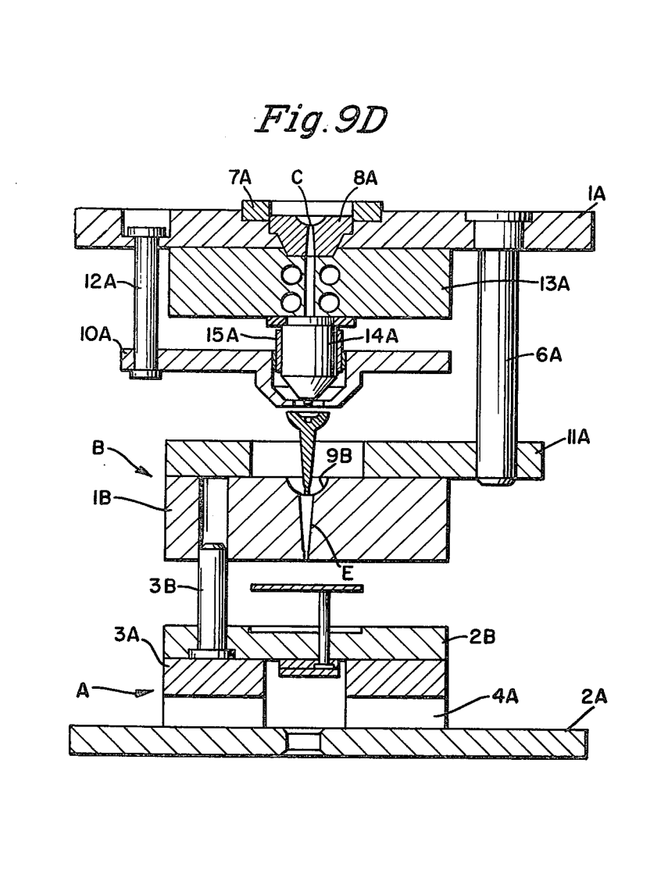

FIGS. 9A and 9B illustrate the most basic construction, wherein a hot runner system is employed in the mold device of the present invention. A molten plastic (or resin) emergent out of an injection machine is guided to a runner nozzle 14A passing through a runner passage R within a heater plate 13A. The plastic from the runner nozzle 14A is injected into a mold cavity formed by molding portion B. The construction of the runner nozzle 14A is not particularly limited, but in the case of the illustrated embodiments of FIGS. 10 and 11, a nozzle cylinder 14A-1 having a nozzle orifice D at the tip F thereof is interiorly provided wwith a manifold 14A-2 in coaxial relation therewith to form a passage for the molten plastic between the manifold 14A-2 and the nozzle cylinder 14A-1. An end heater 14A-3 is mounted in a suspended fashion at the lower end of the manifold 14A-2 opposed to the nozzle orifice D.

Figure 10:
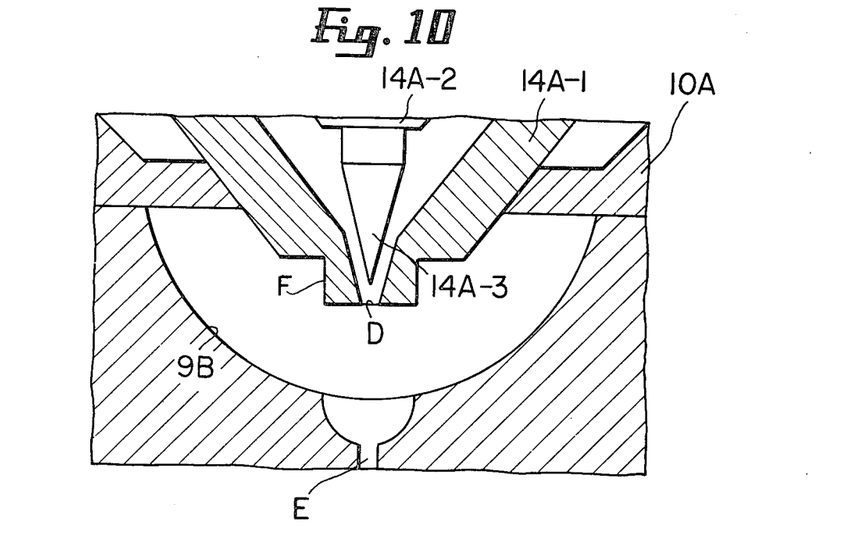
FIG. 10 is a longitudinal sectional view with an essential part enlarged showing a construction of runner connection between the mounting portion and the molding portion in the embodiment shown in FIGS. 9A and 9B.
Figure 11:
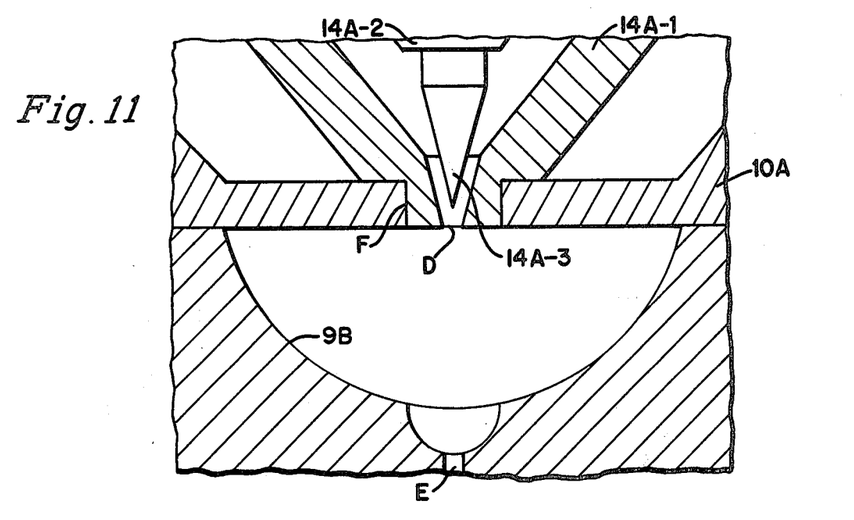
FIG. 11 is a sectional view similar to FIG. 10, but with the nozzle not protruding into the dimple of the molding portion.

Received on the nozzle cylinder 14A-1 is a heater 15A to heat and hold the molten plastic within the runner nozzle 14A in a molten state as desired. Also, in connection with the aforesaid heating, a suitable heating means may be provided within the manifold 14A-2 so as to heat the molten plastic within the runner nozzle 14A.

End heater 14A-3 is provided to prevent the molten plastic at the nozzle orifice D, which tends to be influenced by the cooling effect of the mold plate 1B on the fixed side, from being cooled and solidified.

The mold plate 1B on the fixed side has concave dimple 9B having a sufficiently sider opening area than that of the nozzle orifice D, and at the bottom of the excess runner concave dimple 9B there is formed a gate E of small diameter in communication with the mold cavity.

In this manner, the gate E is formed at the bottom of the excess runner dimple 9B so that when the mounting portion A and the molding portion B are combined in a given positional relation, the nozzle orifice D in the runner nozzle 14A is open to the excess runner dimple 9B.

Accordingly, the molten plastic emergent out of the runner nozzle 14A is injection into dimple 9B, from which the plastic is injected into the mold cavity, passing through the gate E.

Since the open filling area of the dimple 9B is far greater than that of the nozzle orifice D, nozzle orifice D can be open to runner concave portion 9B despite a fairly large displacement in installing positional relationship between the mounting portion A and the molding portion B. whereby the injection operation of the molten plastic may be accomplished without any obstacle.

As shown in FIG. 10, when the nozzle orifice D projects beyond a stripper plate 10A such that it extends into the dimple 9B, an excess runner or waste sprue is formed in the dimple 9B simultaneously with injection molding of a product. This waste sprue is held on the side of runner nozzle 14A without fail at the time of the mold opening operation, so that the waste sprue may be separated by means of stripper plate 10A.

Figure 15A:
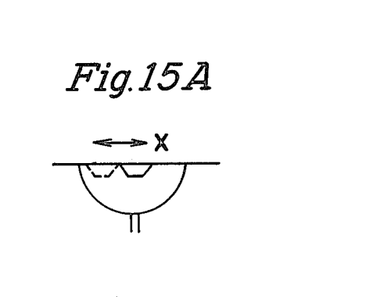
FIGS. 15A and 15B are schematic views disclosing the nozzle barely extending into the dimple, FIG. 15A showing off-center positioning of the nozzle in phantom lines.
Figure 15B:
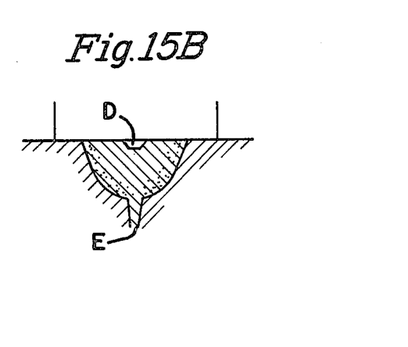

Since the filling opening of dimple 9B has a far greater opening area than that of the nozzle orifice D, the injection of the molten plastic from the runner nozzle 14A into the mold cavity may be accomplished without any obstacle even if the axis of the nozzle orifice D should be off-center with respect to the axis of dimple 9B as shown in FIGS. 15A and 15B. For this reason, it is not necessary to provide strict positioning (or centering) between the mounting portion A and the molding portion B; the injection operation may be accomplished without any obstacle even if a fairly large displacement (due to loose machining tolerances or the like) in positioning between the mounting portion A and the molding mold portion B should occur.

Further, since dimple 9B is in the form of a concave configuration, the molten plastic emergent out of the runner nozzle 14A passing through the nozzle orifice D flows towards the gate E with little changing its flowing direction and is injected into the mold cavity. Thus, the phenomenon of molten plastic emergent out of the runner nozzle 14A causing a reduction in injection pressure within a dimple 9B scarcely occurs. As a consequence, injection molding may be accomplished with minimal loss of injection pressure.

In addition, since gate E is formed at the bottom of dimple 9B with a diameter separate from the diameter of nozzle orifice D, the diameter of the gate E can be set to a sufficiently small value. Conversely, the diameter of the nozzle orifice D may be suitably designed for injection of molten plastic and no problem in external appearance of the product need be taken into consideration. As a consequence, good injection operation may be achieved while, at the same time, the diameter of the gate E may be reduced to reduce or eliminate impairment of the external appearance of the product caused by gate E.

As is evident from the foregoing, by formation of the dimple 9B with a sufficient dimension, positioning of the molding portion B to the mounting portion A will not be affected at all by a minor lateral displacement of molding portion with respect to mounting portion A. Therefore, if several different molding portions B are preformed, with respective dimples 9B, these molding portions B may be interchangeably installed on the same mounting portion A. Moreover, installation and replacement of the molding portion B to the mounting portion A may be accomplished simply, in a short time, and securely since strict positioning between the mounting portion A and the molding portion B is not required. This allows an extremely expensive mounting portion A to be used in common to a number of molding portions B so that equipment cost required for the injection molding machine may be greatly reduced.

Figure 12A:
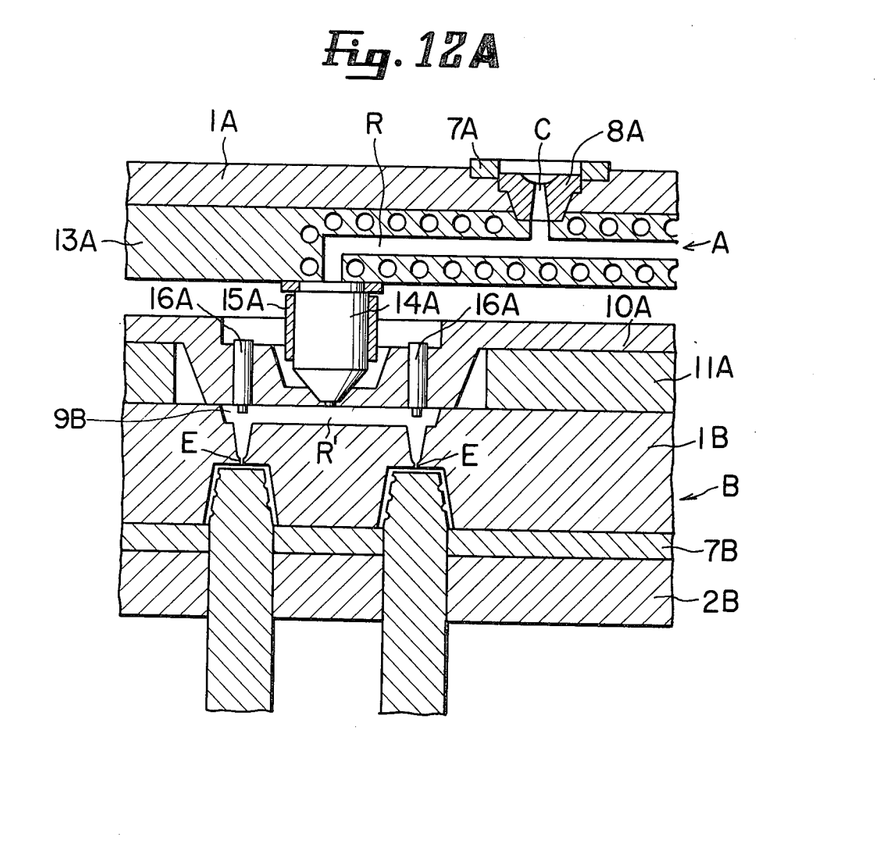
FIGS. 12A and 12B are partially longitudinal sectional views with a molding portion adapted to mold products twice the number of the previous figures, FIG. 12A showing the mold closed and FIG. 12B showing the mold open.
Figure 12B:
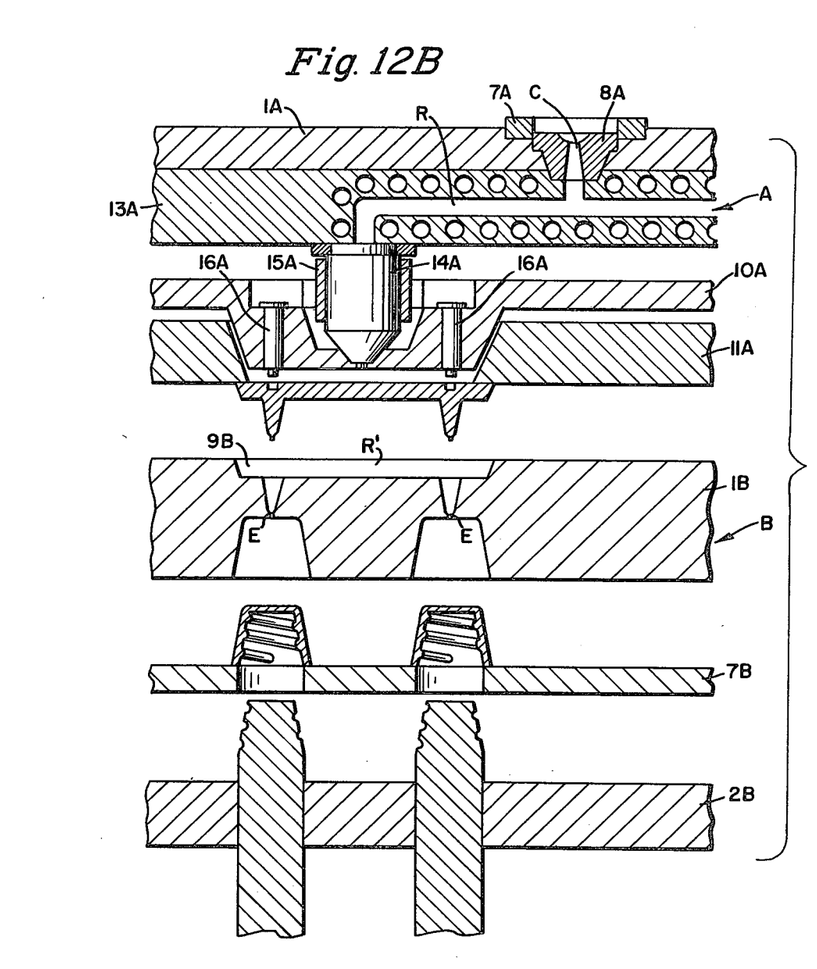

FIGS. 12A and 12B illustrate an embodiment in which a number of runner nozzles 14A may be mounted on the mounting portion A so that a number of articles may be obtained by means of a hot runner system.

In the embodiment shown in FIGS. 12A and 12B, a heater plate 13A is interiorly formed with a Runner R, through which molten plastic is guided into the runner nozzles 14A. From these runners nozzles, molten plastic is injected into the mold cavity. Therefore, in relation to the plurality of molded products formed, the quantity of excess runner or waste sprue formed is very small, and ratio of product to the amount of molten plastic consumed is extremely high.

Of course, in the embodiment shown in FIGS. 12A and 12B, when each dimple 9B is of sufficient dimension, positioning of the molding portion B to the mounting portion A also can be extremely easy and several kinds of different molding portions B may be used in common to one unit of mounting portion A. Since the molten plastic emergent from the nozzle orifice D must be changed in its flowing direction, it is not desirable to cause the nozzle orifice D to be extended into dimple 9B. It is therefore desirable to cause the nozzle orifice D to be positioned externally of dimple 9B, as shown in FIGS. 11, 12A, and 12B.

Accordingly, in this embodiment, it is preferred that runner lock pin 16A is positioned so that at the time of mold opening operation, the waste sprue is disengaged from the mold plate 1B on the fixed side and held on the runner nozzle 14A for stripping by stripper plate 10A.

Figure 13:
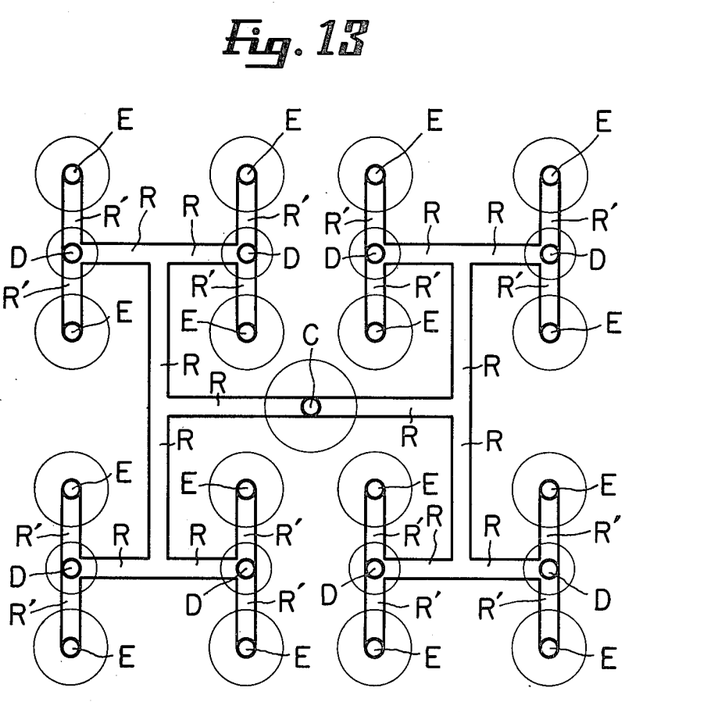
FIG. 13 is a plan view showing a positional relation between the runners, nozzles and products in the embodiments shown in FIGS. 12A and 12B.
Figure 14:
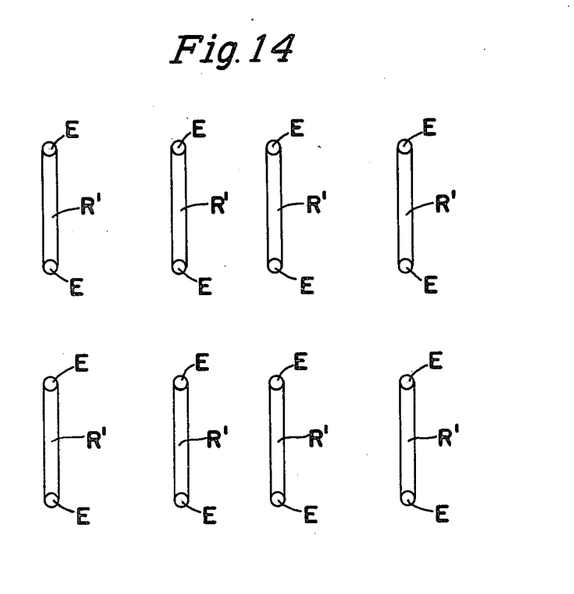
FIG. 14 is a schematic view of FIG. 13, showing only the excess runner R' in relation to the gates E in order to clearly discriminate it from the hot runner passages R.

FIG. 13 illustrates the positional relationship between the runners R, nozzle orifices D, and gates E in the embodiment shown in FIG. 12 in a machine obtaining sixteen articles. As can be seen from the figure, connecting runners R' of dimple 9B that form part of the waste sprue are very small as compared to runners R formed within a heat plate 13A.

As is apparent from the above-mentioned description, the mounting portion A and the molding portion B in the mold device of the instant inventions can be handled as an integral combination and can be engaged and disengaged without modification. Therefore, engagement and disengagement between the mounting portion A and the molding portion B may be accomplished in a simple and secure way, and the costly mounting portion A can be used in common to a number of molding portions B, with a more economical result than prior art devices. In addition, in the case of employing the hot runner system, machining accuracy and installing accuracy for a number of different molding portions B to be interchangeably installed on one mounting portion A need not be observed so strictly. Therefore, a great allowance of error may be permitted, resulting in a readiness of utilization of the hot runner system and attainment of good operation.

Furthermore, the mode of obtaining a number of articles utilizing the hot runner system provided with a number of runner nozzles 14A may be carried out in a simple way, whereby the molten plastic can be used effectively for molding useable products with great savings, since the ratio of waste sprue to useable products is small.

Although the invention has been described in its preferred from with a certain degree of paticularity, it is to be understood that the present disclosure of the preferred form may be changed in details of construction, and a combination and arrangement of parts may be resorted to without departing from the spirit and the scope of the invention as hereinafter claimed.

I claim:

1. A mold device for the production of molded articles by an injection molding machine, said machine including a fixed side and movable elements, comprising:

a mounting portion adapted to utilize a hot runner system by mounting a heater plate on a mounting plate on said fixed side and incorporating a runner nozzle in communication with the runner formed within said heater plate, said runner nozzle having a tip portion and an outlet orifice;

a mold plate on said fixed side, said mold plate having a runner concave portion formed as a depression in an installing surface portion of said mold plate, said concave portion having an inlet opening opposed to said nozzle orifice of said runner nozzle to receive molten material when flowing from said nozzle orifice;

said nozzle outlet orifice having an internal diameter and said inlet opening having an internal diameter, said inlet opening internal diameter at least one-third greater than said nozzle orifice internal diameter, whereby a very imprecise lateral alignment is permissable between said nozzle outlet orifice and said inlet opening and a large number of different mold plates may be used interchangeably with said runner nozzle and said fixed side;

a gate which is in communication with the interior of a mold cavity, opening from the bottom of said runner concave portion, the inlet to said gate being separated from said nozzle orifice by a distance sufficient to produce a waste sprue corresponding substantially to said concave portion, said waste sprue produced during the molding of each of said articles and separable from said nozzle after the molding of each of said articles; and a stripper means movable relative to said nozzle for stripping said waste sprue from said nozzle.

2. A mold device according to claim 1 further comprising a plurality of runner nozzles incorporated in said heater plate and connected to an inlet for receiving the molten plastic from an injection machine by means of runners, said runner nozzles each having an outlet nozzle orifice, each of said orifices opposing a depressed concave portion in an installing surface portion of a mold plate, each of said concave portions having a gate opening at the bottom thereof, the inlet to said gate being separated from said nozzle orifice.

3. A mold device according to claim 1, in which said stripper means is slidable on said nozzle.

4. A mold device according to claim 1, in which said nozzle orifice is substantially off-center with respect to said gate.

5. A mold device according to claim 1, in which said nozzle orifice does not extend below said installing surface.

* * * * *